Feb. 19, 1957 J. H. BRADFORD 2,782,018
METHOD OF HEAT PROCESSING FINELY DIVIDED
MATERIALS AND FURNACE THEREFOR
Filed June 5, 1950 2 Sheets-Sheet 1
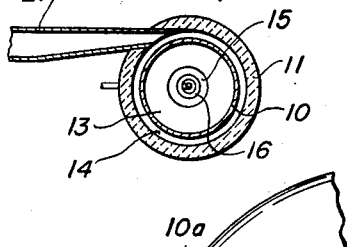
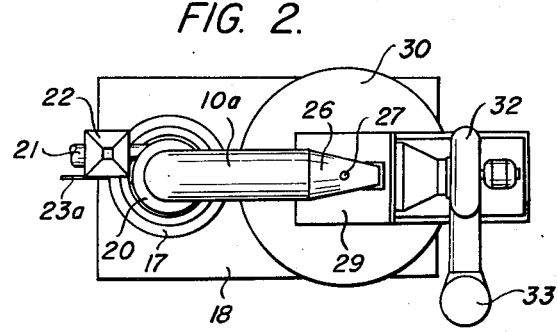
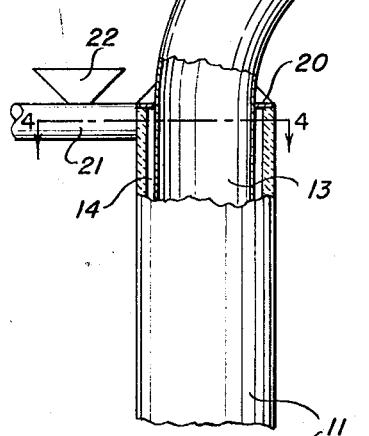
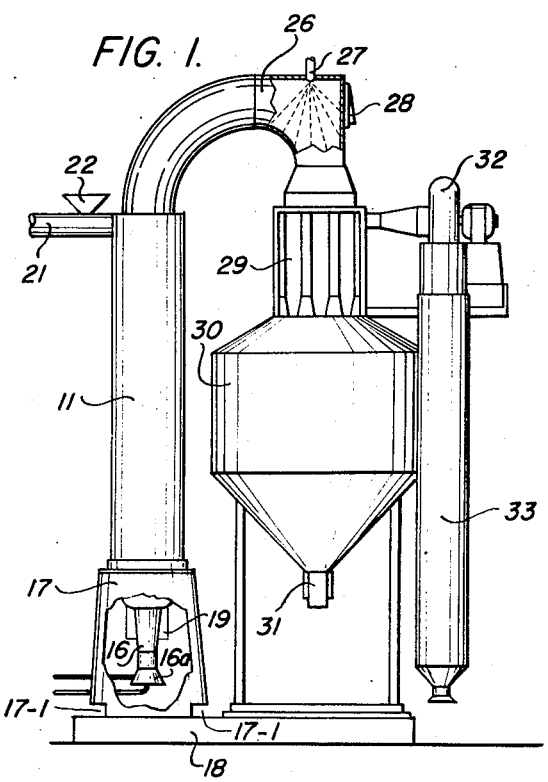
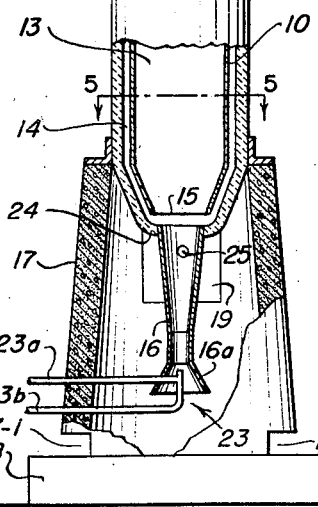
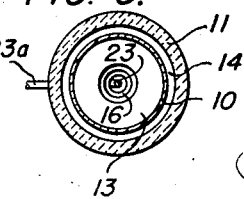
Inventor:
JAMES H. BRADFORD,
Attorneys.

Feb. 19, 1957  J. H. BRADFORD  2,782,018
METHOD OF HEAT PROCESSING FINELY DIVIDED
MATERIALS AND FURNACE THEREFOR
Filed June 5, 1950  2 Sheets-Sheet 2
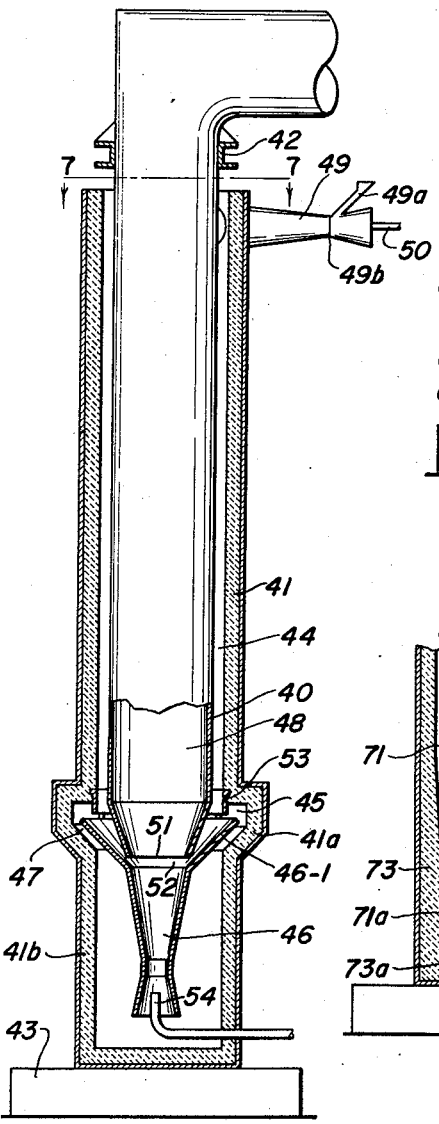
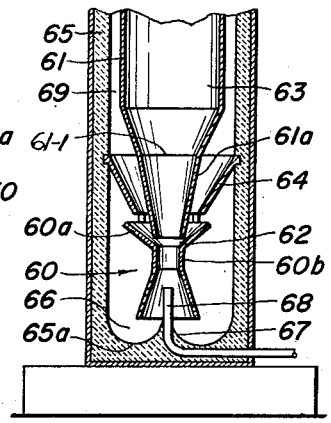
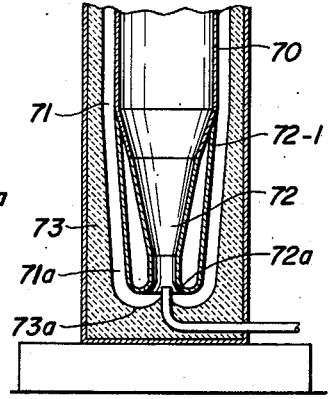
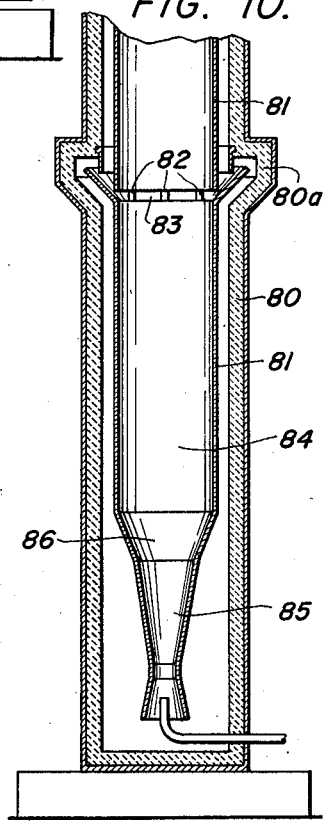
Inventor:
JAMES H. BRADFORD

United States Patent Office 2,782,018
Patented Feb. 19, 1957

2,782,018

METHOD OF HEAT PROCESSING FINELY DIVIDED MATERIALS AND FURNACE THEREFOR

James H. Bradford, Tooele, Utah, assignor of one-half to Combined Metals Reduction Company, a corporation of Utah Application June 5, 1950, Serial No. 166,170

12 Claims. (Cl. 263—21)

This invention relates to the heat processing of various finely divided materials, and provides an improved material-processing furnace for the purpose. The invention includes, in new relationship, certain features disclosed by my copending application Serial No. 44,194, filed August 13, 1948, now Patent No. 2,639,132, also dealing with the heat treatment of materials.

Among the principal objects of the present invention are:

To effectively and efficiently apply heat to various materials which are in a finely divided state, especially limestone for the production of lime;

To carry out the above in a continuous process, including a preheating stage and a calcining or similar stage involving the combustion of fuel in intimate association with the material being processed;

To carry out the two heating stages countercurrent to each other;

To abstract heat from the walls of a reaction chamber, and to utilize such heat for preheating the material about to be processed;

In the production of lime, if a hydrated lime product is desired, to provide for hydrating the calcined lime rock immediately following the calcining operation;

To provide a simple and relatively inexpensive furnace structure for carrying out the method.

An outstanding feature of the method of the invention is the maintaining of a dynamic fluid suspension of the particles of material during both the stage of preheating and the stage of heat processing, such dynamic fluid suspension being continued through the hydrating stage in instances where such a stage is provided.

Another important feature is the circulation of the dynamic fluid suspension about the walls of a reaction chamber, exteriorly thereof, immediately prior to its introduction thereinto, so as to both preheat the material being processed and to abstract heat from peripheral regions of the reaction chamber.

Preferred apparatus for carrying out the method of the invention comprises mutually spaced, substantially concentric shells which are advantageously but not necessarily of cylindrical formation, the inner shell or furnace tube defining a reaction chamber and being formed of a material having good heat-conductive properties, and the outer shell or jacket defining a preheating circulation chamber around the furnace tube and being formed of a material having good heat-insulating properties. The two shells are positioned vertically, or near vertically, so as to utilize the force of gravity to advantage in the operation of the apparatus. A conduit for conducting a forced draft leads into the circulation chamber between the two shells at an upper part thereof, and means for gradually feeding into the said conduit the finely divided raw material to be processed is provided so that a fluid suspension of such material is formed, air being the preferred fluid vehicle. By directing the flow of such fluid suspension into the circulation chamber tangentially thereof, a helical downward flow about the exterior walls of the inner shell or furnace tube is produced, which abstracts heat from peripheral regions of the reaction chamber, and serves to preheat the fluid suspension of raw material.

The furnace tube has a bottom firing orifice through which a burner forces a blast of atomized fuel. The burner is preferably Venturi inspiratory type, and the circulation chamber preferably leads and discharges thereinto. Thus, in the more preferred forms of the invention, an intimate mixture of fuel, particles of raw material to be processed, and air for supporting combustion is blown upwardly into the reaction chamber, where it is ignited into a flaming, fluid suspension of the material particles being treated. The treated particles are withdrawn, together with the gases of combustion, at the upper part of the reaction chamber, and, if a hydrated product is desired, are subjected to a water spray during transit. A dust collector is preferably employed to recover the treated particles as an end product.

Operations besides the production of lime from particles of limestone which may be carried out to advantage in accordance with the invention include various reducing operations, such as the reduction of iron oxide to sponge iron and of zinc oxide to zinc metal, and combined reduction and chlorination to form metal chlorides.

Additional objects and features of the invention will become apparent from the following detailed description of the method and of presently preferred embodiments of apparatus illustrated in the accompanying drawings.

In the drawings:

Fig. 1 represents a side elevation, partly in vertical section, of one embodiment of calcining apparatus pursuant to the invention;

Fig. 2, a top plan view;

Fig. 3, an enlarged fragmentary side elevation shown to a greater extent in vertical section than the view of Fig. 1;

Fig. 4, a horizontal section taken on the line 4—4 of Fig. 3;

Fig. 5, a horizontal section taken on the line 5—5 of Fig. 3;

Fig. 6, a vertical section taken centrally through another embodiment of apparatus conforming to the invention;

Fig. 7, a horizontal section taken on the line 7—7 of Fig. 6;

Fig. 8, a view similar to that of Fig. 6, but fragmentary in character and showing a different arrangement of the material feed;

Fig. 9, a view similar to that of Fig. 8, but showing a still different arrangement of the material feed; and Fig. 10, a similar view, but showing another arrangement of the material feed.

Referring now to the drawings: the apparatus illustrated in Figs. 1 to 5 comprises an elongate, inner, tubular shell 10 surrounded in spaced relationship by a similarly elongate, outer, tubular shell 11. The inner shell 10 is formed of material having both refractory and good heat-conductive qualities, stainless steel and the chrome-nickel alloy known commercially as "Inconel" having been found to be excellent materials for the purpose. The outer shell 11 is formed of any suitable material having good heat-insulating properties, for example a refractory brick.

Both the shells 10 and 11 are advantageously of cylindrical formation, concentrically arranged. The inner shell 10 constitutes, in effect, a furnace tube defining an elongate reaction chamber 13, while the outer shell 11 constitutes a jacket defining a circulation chamber 14 about the exterior wall surfaces of the furnace tube. The lower end portions of both furnace tube and jacket are tapered inwardly to terminate in respective bottom openings. The bottom opening 15 of the furnace tube 10 serves as a firing orifice for the reaction chamber 13, while the bottom opening of the jacket 11 has tightly fitted thereinto the upper flaring end of a Venturi burner tube 16.

The jacket 11 is supported by a hollow base 17 built up on a foundation slab 18. Both the base 17 and foundation 18 are desirably formed of concrete. Air inlet openings 17–1 are provided through the walls of the base 17, as well as a door 19 to afford access to the interior.

The top of jacket 11 and of the circulation chamber 14 defined thereby is closed by an annular insulating plate 20, through which passes the upper portion of furnace tube 10. A material feed conduit 21 leads into the circulation chamber 14, preferably tangentially thereof as shown in Fig. 4, such conduit passing through jacket 11 at the upper end thereof, advantageously immediately below the plate 20.

Since it is desired that a fluid-suspension of the raw material be introduced into the circulation chamber 14, means for the supply of same is provided. In the illustrated embodiment, a blower (not shown) is interposed in conduit 21 in advance of suitable material-feed means, here shown as a gravity-feed hopper 22. Thus, in operation, the finely divided material to be processed is dynamically suspended in a stream of combustion-supporting air, which is forcibly blown into the circulation chamber 14 so as to gradually descend along a helical path in intimate association with the exterior walls of the furnace tube 10.

A jet burner pipe 23 is positioned at the intake end of the Venturi burner tube 16, so as to direct a jet of atomized fuel upwardly through the burner tube and into the furnace tube 10. Such jet burner pipe 23 is here illustrated as being of liquid or gaseous fuel type, the fuel being supplied through a pipe 23a, and an atomizing blast of compressed air being supplied through a pipe 23b.

It will be noted that, in the operation of the above apparatus, air-suspended raw material to be processed is fed into the ascending atomized-fuel jet, under forced draft, through the annular discharge orifice 24 at the bottom of the circulation chamber 14. The feeding action is facilitated and a very thorough mixing of raw material, fuel, and combustion-supporting air is accomplished by the inspiratory effect of the Venturi burner, it being noted that the annular discharge or injection orifice 24 and the lower margin of the furnace tube provide, in effect, a continuation of the upwardly divergent part of the Venturi tube.

An aperture 25 formed through the wall of the tapered bottom end portion of the outer shell or jacket 11 opposite the access door 19 enables the ascending column of atomized fuel to be ignited by any suitable means at the commencement of any given operative run of the apparatus. Such aperture 25 also serves as a reject opening for foreign matter or oversize pieces of raw material in the manner explained in my afore-referred-to copending application for patent.

The upper end of the inner shell or furnace tube 10 extending beyond the confines of jacket 11 is preferably formed as an arcuate bend 10a leading into a water-spray chamber 26, which may be utilized for hydrating lime or other calcined material discharged from furnace tube 10, or for rapidly chilling perlite granules in the manner of my said copending application if the furnace is used for "popping" perlite. A suitable spray-head 27, advantageously of fog-forming type, projects inwardly of chamber 26 through the defining walls thereof. When a hydrated or rapidly cooled product is not desired, the spray-head remains idle. A door 28 may be provided to furnish access to the spray chamber, and as a safety valve.

The outlet of spray chamber 26 desirably leads into a suitable dust collector, preferably and as here illustrated a multiple cyclone 29, from where the product passes into a storage hopper 30 provided with a bagging valve 31 which controls the discharge of the product into bags or other suitable containers for marketing. As is customary, the multiple cyclone 29 is equipped with an exhaust fan 32 and a filter bag 33.

It should be noted that, incorporated as it is in the entire structural combination, the exhaust fan 32 of the multiple cyclone aids in sustaining the dynamic fluid-suspension of raw material in its passage through the apparatus, as well as aiding in effecting said passage.

In carrying out the method of the invention, the afore-described apparatus provides for the maintaining of a processing zone within the furnace tube 10, and provides, within the jacket 11, for the maintaining of a circulation zone surrounding the processing zone in intimate association therewith. A dynamic fluid-suspension of the raw material to be processed is preheated by passing the same through the circulation zone, and the preheated raw material is passed through the processing zone while the dynamic fluid-suspension thereof is maintained by the action of the Venturi burner.

It should be noted that the passage of the fluid-suspension through the processing zone is countercurrent to its prior passage through the circulation zone, and, further, that the resulting fluid-suspension of processed material is dynamically sustained during its passage through the hydrating chamber and into the dust collector.

Another form of apparatus of the invention for carrying out the method is illustrated in Fig. 6, variations in the material feed arrangement being illustrated in Figs. 8, 9 and 10, respectively.

As illustrated in Fig. 6, the inner shell or furnace tube 40 is suspended within the outer shell or jacket 41 from a girder 42 through which it passes and which is supported by suitable columns or other structure (not shown). The outer shell or jacket 41 provides, in itself, the base for the furnace structure, and rests upon a foundation slab 43.

In this embodiment, it is desired that all the combustion supporting air be preheated prior to passage through the burner. For this purpose, the upper end of the circulation chamber 44, defined between the two shells 40 and 41, is open, while the lower end thereof terminates in an annular chamber 45 defined by an outwardly protruding, annular, shoulder formation 41a of the outer shell or jacket 41.

The burner tube 46, which is here, as in the first described embodiment, preferably of Venturi formation, has an outwardly flared rim extension 46–1 rising from its upper end and projecting into the annular chamber 45 below the lower end of the circulation chamber 44. The outer edge of such rim extension is spaced apart from the inner walls of the shoulder portion 41a of the outer shell or jacket 41 to define, therewith, an annular passage 47 through which preheated air passes from the circulation chamber 44 after deposit of suspended particles of raw material which it carries. Such preheated air passes through the base portion 41b of the outer shell 41, and into the lower intake opening of the Venturi burner tube 46, where it provides a combustion-supporting draft upwardly through the burner tube and into and through the reaction chamber 48 of furnace tube 40.

Solid material particles to be processed are fed into the upper end of the circulation chamber 44, preferably tangentially thereof, as illustrated, Fig. 7, through a feeder 49, which is advantageously a Venturi tube having a material-charging chute 49a leading into its constricted throat portion 49b. Compressed air from any suitable source (not shown) is directed into the Venturi tube 49 through a jet pipe 50.

The blast of material-carrying air entering circulation chamber 44 from the Venturi feeder tube 49 swirls downwardly through circulation chamber 44 along a helical path and in intimate and intermixing association with the draft of combustion-supporting air entering the circulation chamber through its open upper end.

The lower end of inner shell or furnace tube 40 diverges upwardly from a bottom firing orifice 51 located immediately above the open upper end of Venturi burner tube 46 and within the cup formed by the flaring rim extension 46–1. The annular lower edge of such furnace tube 40, which defines the firing orifice 51, is spaced upwardly from the inner surface of the flaring rim extension 46–1 to provide an annular opening 52 for entry of the material particles to the reaction chamber 48. It should be noted that the material particles to be processed are drawn in through the annular opening 52 while still in fluid suspension, and at least partially by the aid of the inspiratory action of the burner tube. An annular baffle 53, anchored at its upper end in the outer shell 41, depends into the annular chamber 45 above the interior of the flaring rim extension 46–1, so as to minimize any tendency for material particles to follow the combustion-supporting air passing downwardly through the annular passage 47.

A fuel injection pipe leads into the lower end of the Venturi burner tube 46, in this instance being shown as terminating in a gas jet 54.

The reaction products from chamber 48 are drawn through other portions of the processing equipment as illustrated and described with respect to the first embodiment dealt with above.

In the embodiment of Fig. 8, a relatively short and squat burner tube 60 combines with an elongate and upwardly divergent, depending extension of the lower end of the inner shell or furnace tube 61 to form both a Venturi burner tube and an annular opening 62 for entry of the fluid suspension of material particles into the reaction chamber 63. The upwardly divergent portion 60a of the burner tube 60 serves the same purpose as the annular rim extension 46–1 of Figs. 6 and 7, while an annular deflecting baffle 64 of funnel formation serves the purpose of baffle 53 of said figures. The open bottom of the furnace tube 61 is disposed immediately over the throat 60b of the burner tube 60, so that the upwardly divergent lower portion 61a of the furnace tube becomes, in effect, the upper divergent portion of the Venturi burner. Thus, the firing orifice of the reaction chamber 63 is actually located at 61–1. The floor 65a of the outer shell 65 is curved to form an annular concavity 66 having a center peak 67 through which the fuel injection pipe 68 projects, thereby streamlining the change of direction and entry of the combustion-supporting air from circulation chamber 69 into the lower opening of the Venturi burner tube.

As illustrated in Fig. 9, the inner shell or furnace tube 70 may be formed substantially as shown in the embodiments of Figs. 3 and 7, but the Venturi burner tube is formed and secured thereto to provide a lower extension 71a of the circulation chamber 71 leading directly into the lower convergent portion 72a of the Venturi burner tube 72. For this purpose, the Venturi burner tube 72 is constructed with an outer wall 72–1 spaced from the tube proper, both the upper end of the tube proper and of the outer wall 72–1 being secured directly to the lower end of the furnace tube as shown. The floor 73a of outer shell 73 is curved as in the embodiment of Fig. 8, and the juncture between outer wall 72–1 and the lower end of the burner tube proper is correspondingly curved to streamline the entry of the fluid suspension of material particles to be processed into the lower end of the Venturi burner tube.

In Fig. 10, the material feed is located intermediate the length of the inner shell or furnace tube, well above the burner tube. As illustrated, an annular shoulder formation 80a similar to that of Fig. 6 protrudes outwardly from the outer shell or jacket 80 at the intermediate location desired for material feed. The inner shell or furnace tube 81 is formed in two longitudinal parts spaced apart at the location of such shoulder formation 80a, as by means of a plurality of spaced, narrow strips 82, thereby defining an annular opening 83 for the entry into reaction chamber 84 of the fluid suspension of material particles to be processed. A Venturi burner tube 85 is secured directly to the lower end of the furnace tube 81 about the rim of firing orifice 86.

In all the above embodiments of apparatus, the furnace tube defining the reaction chamber diverges upwardly from the rim of the firing orifice forming a divergent entry to the reaction chamber. As is disclosed by my afore-referred-to copending application Ser. No. 44,194, the divergency of such entry is gradual longitudinally of the reaction chamber to insure complete firing coverage thereof with no static areas for deposition and collection of material being processed.

In instances where perlite or other raw material having a tendency to adhere to heated walls of oxidized or oxidizable material is processed, the outer insulating shell or jacket is preferably lined with a thin sheet of stainless steel, "Inconel," or other non-oxidized or non-oxidizable material.

Whereas this invention is here illustrated and described with respect to presently preferred specific forms of apparatus thereof, it should be understood that various changes may be made therein and various other forms may be adopted on the basis of the teachings hereof, by those skilled in the art, without departing from the protective scope of those of the following claims which are generic to the broader inventive concepts disclosed.

I claim:

1. A method of heat processing materials, comprising maintaining a fired reaction zone; maintaining an elongate, annular, circulation zone surrounding the reaction zone in intimate association therewith; introducing raw material to be processed into a forced stream of combustion-supporting fluid to form a dynamic fluid suspension of said raw material; passing the resulting fluid suspension through and along substantially the length of said circulation zone in substantially helical flow formation, for preheating said raw material while at the same time abstracting heat from peripheral regions of said reaction zone; and passing the thus preheated raw material into and through said reaction zone while dynamically maintaining the said fluid-suspension thereof.

2. Apparatus for the heat processing of finely divided materials, comprising in combination an elongate furnace tube having a firing orifice adjacent one end thereof and a discharge opening adjacent the opposite end thereof, means defining an elongate, annular, preheating chamber surrounding and in intimate heat-absorbing association with said furnace tube, said preheating chamber having a discharge orifice directed into said furnace tube so as to discharge preheated material thereinto; forced blast feeder means for finely divided material, said feeder means being directed substantially tangentially into said preheating chamber adjacent an end thereof remote from said discharge orifice; and a blast burner directed into said firing orifice of the furnace tube.

3. Apparatus for heat processing finely divided materials, comprising, in combination, a substantially vertically disposed, heat-transmitting, tubular shell constituting a furnace tube and defining a reaction chamber; a second tubular shell of heat-insulating material surrounding said furnace tube, in spaced relationship therewith, and constituting a jacket defining a circulation chamber extending about the outer surface of and along the length of said furnace tube; forced blast feeder means for finely divided material, said feeder means being directed substantially tangentially into the upper part of said circulation chamber; a firing orifice at the bottom of said furnace tube; jet burner means arranged to direct a jet of fuel upwardly into said furnace tube through said firing orifice thereof; and passage means between said circulation chamber and said reaction chamber, for the introduction of said fluid-suspension of finely divided raw material from the former into the latter.

4. The combination recited in claim 3, including a Venturi tube leading upwardly into the firing orifice of the furnace tube, and wherein the said passage means surrounds the upper discharge opening of the Venturi tube, and the atomizing jet burner means is directed upwardly of said Venturi tube, whereby the preheated fluid-suspension of raw material is inspirated through said passage means and forced upwardly through the furnace tube in intimate mixture with the atomized fuel.

5. The combination recited in claim 3, wherein the passage means is defined from below by an annular lip which flares outwardly into the circulation chamber.

6. The combination recited in claim 5, wherein a Venturi tube leads upwardly into the firing orifice of the furnace tube, and the passage means is formed between the upper end of the said Venturi tube and said firing orifice of the furnace tube.

7. The combination recited in claim 6, wherein the passage means is formed between the upper end of the constricted throat of the Venturi tube and the firing orifice of the furnace tube, the upper cone of the Venturi tube providing the annular lip.

8. The combination recited in claim 3, wherein the passage means is disposed intermediate the length of the furnace tube.

9. The combination recited in claim 3, wherein a Venturi tube leads upwardly into connection with the firing orifice of the furnace tube; wherein the said passage means is defined by wall means extending the circulation chamber along the length of said Venturi tube, so that it extends to and leads into the lower open end of said Venturi tube; and wherein the jet burner means is directed upwardly of said Venturi tube at the lower open end thereof, whereby the preheated fluid-suspension of raw material is directed into the said lower open end of said Venturi tube together with the jet of fuel.

10. Apparatus for the heat processing of finely divided materials, comprising, in combination, an elongate furnace tube of heat-conductive material having a firing orifice adjacent one end thereof and a discharge opening adjacent the opposite end thereof; a second elongate tube embracing said furnace tube in spaced relationship therewith to define a jacket substantially completely around the latter and providing a circulation chamber in intimate heat-absorbing association with said furnace tube; a blast burner having its firing end directed into said firing orifice of the furnace tube and being open at its opposite end for the entry of combustion-supporting air; wall means disposed in spaced relationship to said blast burner and substantially enclosing the said opposite end thereof against the atmosphere; air-flow passage means establishing communication between said circulation chamber and the space about said burner, as defined by said wall means, for the supply of air from said circulation chamber to said opposite end of the burner; inlet means for relatively cool air adjacent that end of said circulation chamber which is remote from the said firing orifice of the furnace tube; means for propelling air into said circulation chamber through said inlet means, and for passing said air through said air flow passage means into said space about the burner and into said burner through said opposite end thereof; and means for feeding, into the blast of said burner, material particles to be processed.

11. Apparatus as recited in claim 10, wherein the second elongate tube is open to the atmosphere at its end which lies adjacent the said discharge end of the furnace tube, to provide the said inlet means for relatively cool air to the said circulation chamber.

12. Apparatus as recited in claim 10, wherein the said blast burner comprises a Venturi tube, and the said wall means provides, in effect, a continuation of the second tube about and in spaced relationship with said Venturi tube, so that the lower portion of the circulation chamber continues into the said space about the burner, to provide the said air-flow passage means.

References Cited in the file of this patent

UNITED STATES PATENTS

| | | |
|---|---|---|
| 212,508 | Robinson | Feb. 18, 1879 |
| 284,178 | Browne | Sept. 4, 1883 |
| 1,669,476 | Landers | May 15, 1928 |
| 2,044,680 | Gilbert | June 16, 1936 |
| 2,352,738 | Ruthruff | July 4, 1944 |
| 2,421,902 | Neuschotz | June 10, 1947 |
| 2,492,948 | Berger | Jan. 3, 1950 |
| 2,499,704 | Utterback et al. | Mar. 7, 1950 |
| 2,572,484 | Howle et al. | Oct. 23, 1951 |
| 2,612,263 | Slavick | Sept. 30, 1952 |
| 2,619,776 | Potters | Dec. 2, 1952 |
| 2,621,034 | Stecker | Dec. 9, 1952 |